United States Patent
Agarwal et al.

(10) Patent No.: US 9,787,778 B2
(45) Date of Patent: Oct. 10, 2017

(54) GEOGRAPHIC PROXIMITY BASED SERVICE DISCOVERY

(75) Inventors: Gopal Agarwal, Bangalore (IN); Anupam Wadhawan, Bangalore (IN); Partha Narasimhan, Saratoga, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 0 days.

(21) Appl. No.: 13/542,604

(22) Filed: Jul. 5, 2012

(65) Prior Publication Data

US 2014/0010150 A1    Jan. 9, 2014

(51) Int. Cl.
*H04W 4/02* (2009.01)
*H04L 29/08* (2006.01)
*H04L 29/12* (2006.01)

(52) U.S. Cl.
CPC .......... *H04L 67/16* (2013.01); *H04L 61/1511* (2013.01); *H04L 67/18* (2013.01); *H04W 4/02* (2013.01); *H04L 61/609* (2013.01); *H04L 61/6013* (2013.01)

(58) Field of Classification Search
CPC ... H04L 61/609; H04L 61/6013; H04L 67/16; H04L 67/18; H04W 4/02
USPC ......................................................... 370/328
See application file for complete search history.

(56) References Cited

U.S. PATENT DOCUMENTS

| | | | |
|---|---|---|---|
| 7,738,127 B2* | 6/2010 | Winkel ................... | G06F 21/35 358/1.13 |
| 8,200,251 B2* | 6/2012 | Huang .......................... | 455/457 |
| 8,532,658 B2* | 9/2013 | Knisely ......................... | 455/436 |
| 2007/0021126 A1* | 1/2007 | Nanda et al. .............. | 455/456.1 |
| 2009/0092111 A1* | 4/2009 | Horn et al. .................... | 370/338 |
| 2010/0190496 A1* | 7/2010 | Chinnathambi ........... | 455/435.1 |
| 2010/0215024 A1* | 8/2010 | Chiang ............... | H04W 88/182 370/338 |
| 2010/0303049 A1* | 12/2010 | Ibrahim ................ | H04W 4/001 370/338 |
| 2011/0162060 A1* | 6/2011 | Vijayakumar ........ | H04L 12/413 726/13 |
| 2012/0258732 A1* | 10/2012 | Jeong .................. | H04L 12/1432 455/456.1 |

* cited by examiner

*Primary Examiner* — Ian N Moore
*Assistant Examiner* — Mewale Ambaye
(74) *Attorney, Agent, or Firm* — Brooks, Cameron & Huebsch, PLLC (57) ABSTRACT

According to one embodiment of the invention, a method comprises an operation of determining, by a first digital device, a location of a second digital device providing a network service. Thereafter, information is provided to a digital device requesting the network service based on the determined location of the second digital device.

23 Claims, 10 Drawing Sheets

GEOGRAPHIC PROXIMITY BASED SERVICE DISCOVERY

FIELD

Embodiments of the present disclosure relate to the field of network communications, and in particular, a system and method for supporting a service discovery protocol in which the relative geographical location of a digital device requesting network services influences what service information is returned by a digital device responsible for managing such network services.

BACKGROUND

A Domain Name System is a hierarchical distributed naming system that is utilized by digital devices to locate available services or other digital devices through the use of a domain name. Typically, a Domain Name System (DNS) features a centralized DNS server that is adapted to translate a received domain name into a corresponding Internet Protocol (IP) address. Furthermore, the DNS server is responsible for storing records for a domain name (e.g. address records, name server (NS) records, and mail exchanger (MX) records) within an internal database and answering service discovery queries against the database.

Over a decade ago, another naming system, referred to as "Multicast Domain Name System" (mDNS), was developed. This system enables the use of DNS programming interfaces and packet formats, but operates without the need for a dedicated DNS server. In mDNS, service discovery allows a querying digital device (user device) to find all available instances of a particular type of network service provided by one or more digital devices in its vicinity. An application within the user device can then resolve a named instance of the network service to an IP address and port number.

More specifically, in accordance with mDNS service discovery, DNS-formatted Query messages are sent over a shared area network using the same IP multicast address. Upon detecting a Query message, each digital device providing that particular network service (server device) returns a Response message with its name in order to identify itself as providing the queried service. From these Response messages, a list of network services from available server devices can be generated.

In particular, as previously mentioned, mDNS provides service discovery on a shared area network based on multicast distribution. This would entail digital devices on the shared area network to learn the network services advertised by all of its members. Therefore, depending on the size and load of the shared area network, a user device may receive an excessive number of Response messages, some of which may be from server devices that are geographically inconvenient from the user device.

For instance, a print service may be provided by a pair of network printers (server devices), where a first network printer is located on the same floor as the user device while a second network printer is located two floors below the user device. If a Query message for print services prompts Response messages from both network printers, the user may accidentally select the second network printer and be forced to retrieve print jobs from an inconvenient location.

BRIEF DESCRIPTION OF THE DRAWINGS

Embodiments of the present disclosure are illustrated by way of example, and not by way of limitation, in the figures of the accompanying drawings and in which.

DETAILED DESCRIPTION

In the following description, several specific details are presented to provide a thorough understanding of the invention. Embodiments of the disclosure are directed to location based service discovery for wireless networks operating in accordance with the Multicast Domain Name System (mDNS) communication protocol. The location based service discovery addresses some inefficiency by tailoring network services to general location of the user. The concepts and techniques disclosed herein may be practiced in accordance with wired networks and in accordance with other types of communication protocols.

Herein, certain terminology is used to describe features for embodiments of the disclosure. For example, the term "digital device" generally refers to any hardware device that includes a processor. Examples of digital devices include a computer, a tablet, a laptop, a desktop, a netbook, a server, a web server, authentication server, an authentication-authorization-accounting (AAA) server, a Domain Name System (DNS) server, a Dynamic Host Configuration Protocol (DHCP) server, an Internet Protocol (IP) server, a Virtual Private Network (VPN) server, a network policy server, a mainframe, a television, a content receiver, a set-top box, a video gaming console, a television peripheral such as Apple® TV, a printer, a mobile handset, a smartphone, a personal digital assistant "PDA", a wireless receiver and/or transmitter, an access point, a base station, a communication management device, a router, a switch, and/or a controller.

An "access point" is a digital device which may be communicatively coupled to one or more networks (e.g., Internet, an intranet, etc.). The access point, also referred to as "AP," communicates with a wired network and other digital devices over an interconnect.

A "controller" is a combination of hardware, software, and/or firmware that is configured to process and route information between digital devices within a network. In an example, a controller receives information from digital devices within a network and forwards the information to a target access point. In another example, the controller receives information from an access point and forwards the information to digital devices within a network. A controller may support an access point by one or more of: handling network security, enforcing policies, managing authentication, encryption, virtual private network (VPN) connections, IPv4 and IPv6 Layer 3 networking, a Policy Enforcement Firewall (PEF), Adaptive Radio Management (ARM), Spectrum Analysis, admission control, Quality of Service (QoS), and Wireless Intrusion Protection capabilities.

For operations in accordance with mDNS protocol, digital devices may be classified into two different classes. The first class of digital device, referred to as a "server device," constitutes a digital device that is capable of advertising network services for use by other digital devices. Examples of these network services include, but are not limited or restricted to video processing and/or display, audio processing and/or playback, printing, or the like. The second class of digital device, referred to as a "user device," constitutes a digital device that requests a particular network service for use.

It is contemplated that a digital device may include hardware logic such as one or more of the following: (i) processing circuitry; (ii) one or more communication interfaces such as a radio (e.g., component that handles the wireless data transmission/reception) and/or a physical connector to support wired connectivity; and/or (iii) a non-transitory computer-readable storage media (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; etc.) or any connector for receiving a portable memory device such as a Universal Serial Bus "USB" flash drive, portable hard disk drive, or the like.

Herein, the term "logic" (or "logic unit") is generally defined as hardware and/or software. For example, as hardware, logic may include processing circuitry (e.g., a microcontroller, any type of processor, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, source code, object code, a shared library/dynamic load library, or one or more instructions. These software modules may be stored in any type of a suitable non-transitory storage medium, or transitory computer-readable transmission media (e.g., electrical, optical, acoustical or other form of propagated signals such as carrier waves, infrared signals, or digital signals).

The term "interconnect" is a communication path between two or more digital devices. The communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

The term "message" is a grouping of data, which may be placed in the form of a packet, a stream (e.g., a sequence of packets), a frame, an Asynchronous Transfer Mode (ATM) cell, or any other series of bits having a prescribed format.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Certain details are set forth below in order to provide a thorough understanding of various embodiments of the disclosure, albeit the invention may be practiced through many embodiments other that those illustrated. Well-known logic and operations may not be set forth in detail in order to avoid unnecessarily obscuring this description. Moreover, the illustrated embodiments of the disclosure, and the description associated therewith, should be considered as examples of the principles of the invention and not intended to limit the disclosure to those specific embodiments.

General Overview

In general, the use of mDNS proxy logic adds intelligence to an existing nascent mDNS protocol. This logic learns all network services from server devices on a shared area network, but provides classified network service information to individual users, based on location. Therefore, a user device learns only those server devices, hosting a particular network service, which are in the same geographical location as the user device. This classification of network services would be completely dynamic so that, upon moving from one geographical location to another, this user device would see different sets of server devices based on their geographical proximity to the user device.

According to one embodiment of the disclosure, the mDNS proxy logic estimates the relative geographical location of a server device based on which AP it is associated with (AP-server). Whenever a user issues a Query message for a particular network service, the mDNS proxy logic is aware of the current relative location of the user device based on its association with an AP (AP-user). If the AP-server and AP-user are one and the same, both are in geographical proximity to each other. Thus, the mDNS proxy logic can provide this user device details of the local server device. The mDNS proxy logic may discard all other server devices from its response message to the user.

To be associated with the same AP may limit the geographical proximity diameter for two devices. To increase this area, the mDNS proxy logic may consider the neighboring APs (e.g., APs within the signal coverage area of AP-user). In this case, the AP-server could be one of the APs in the neighbor AP list which may cause release of information identifying that the AP-server provides network services requested in the Query message. This would thus make location based service discovery more efficient and practical.

The underlying concept can be extended to subsequent layer of the neighborhood. For example, neighboring APs of each AP in the neighbor list can become part of the geographical proximity. This extension addresses situations where a server device is behind a radio shield and cannot be discovered with just the immediate neighboring APs. Thus, the neighboring diameter can increase based on network deployment requirements.

The neighboring APs for a particular AP would be spatial in nature (e.g., neighboring APs to a given AP will be in three dimensional proximity). This would pose a use case hindrance, when the neighboring AP is spatially near, but still not convenient to the user such as an AP being on a different floor within a building. Here, an AP's location coordinate needs to be considered to decide its eligibility. All APs in the same two-dimensional coordinate as AP-user should be considered, and others ignored. This geographic filtering process would therefore solve all practical use cases. Thus, a user device would see only those server devices that provide the particular network service and are in proximity to user device.

In case a server device has a wired connection to the shared area network, instead of wireless connectivity, it can be statically associated with the geographically nearest AP. A separate list of wired server devices, with their associated APs can be maintained. The mDNS proxy logic may consult this list, when it knows of a wired server device providing the requested network service. The rest of the underlying location based service discovery process applies for a wired server device as well.

Controller-Based Service Discovery Monitoring

A. General Network Architecture

Figure 1:
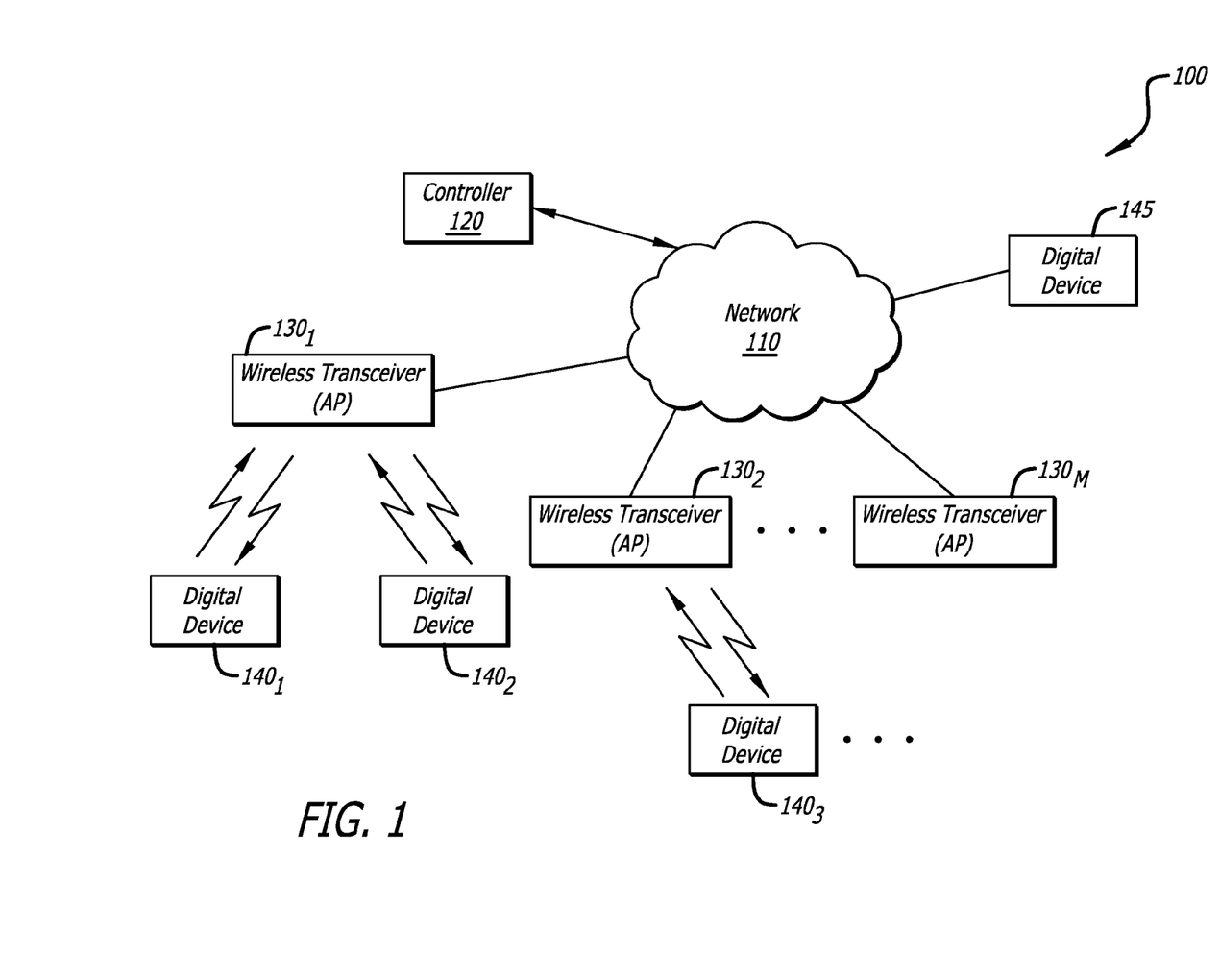
FIG. 1 is a first exemplary embodiment of a network with location based service discovery performed by a controller within the network.

Referring to FIG. 1, a first exemplary embodiment of a network supporting location based service discovery is shown. Herein, a shared network 100 comprises a wired network 110 that supports communications between a controller 120 and one or more wireless transceivers such as access points (APs) $130_1$-$130_M$ (M≥1). APs $130_1$-$130_M$ are adapted to support wireless communications with digital devices $140_1$-$140_N$ (N≥1). It is contemplated that communications within network 100 may be in accordance with the mDNS communication protocol or another type of communication protocol.

Additionally, one or more digital devices (e.g., digital device 145) may be coupled to wired network 110 without use of any wireless signaling. Hence, controller 120 would need to be configured with information identifying which AP $130_1$, ..., or $130_M$ is selected to represent wired digital device 145 for location based service discovery. For example, the AP closest to wired digital device 145 (e.g., AP $130_M$) may be selected as the representative AP.

According to one embodiment of the disclosure, it is contemplated that one or more digital devices within network 100 is responsible for maintaining information concerning (i) which digital devices are associated with a corresponding AP and (ii) which APs are detected within its signal coverage area. As shown in FIG. 1, controller 120 is configured to collectively store the above-identified information. According to one embodiment of the disclosure, one or more Association table(s) and Neighbor AP list(s) may be used as described below.

Figure 2:
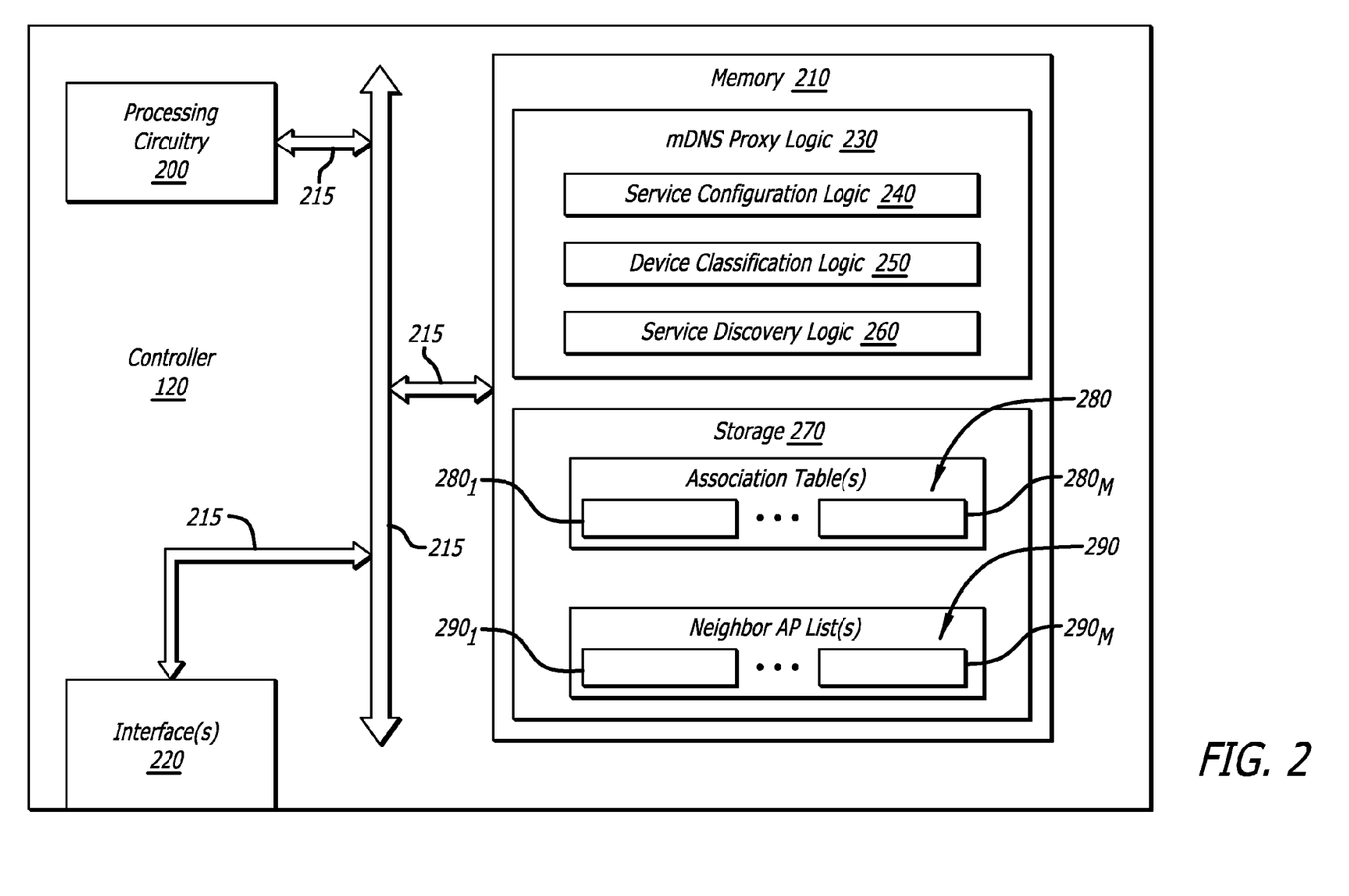
FIG. 2 is an exemplary block diagram of a controller operating as an mDNS proxy and using both association and neighboring access point (AP) information to perform location based service discovery.

Referring now to FIG. 2, an exemplary block diagram of controller 120 operating as an mDNS proxy for network 100 of FIG. 1 is shown. Herein, controller 120 comprises processing circuitry 200 and memory 210, which are coupled via interconnects 215 to one or more interfaces 220 that enable controller 120 to communicate with other digital devices. For instance, interface 220 may be implemented as a physical interface including one or more ports for wired connectors. Additionally, or in the alternative, interface 220 may be implemented with one or more antenna units for supporting wireless communications with other digital devices.

As shown in FIG. 2, according to one embodiment of the disclosure, processing circuitry 200 is coupled to memory 210 for execution of mDNS proxy logic 230 which is stored in memory 210. According to one embodiment of the invention, mDNS proxy logic 230 comprises service configuration logic 240, device classification logic 250, and service discovery logic 260.

Service configuration logic 240 is adapted to enable an administrator to control which network services are supported by controller 120. Such control may be conducted through command-line interface (CLI) commands for example. For instance, according to one embodiment of the invention, CLI commands may be used to enable/disable mDNS proxy logic 230 (see CLI command (1) below) as well as to enable/disable different mDNS proxy services as shown in CLI commands (2) where a first type of network service is enabled while a second service type is disabled as set forth below.

```
mDNS_proxy enable                            (1)
mDNS_proxy_service "airplay"
    id "_airplay._tcp"
    description "AirPlay"
mDNS_proxy_service "airprint"
    id "_ipp._tcp"
    id "_pdl-datastream._tcp"
    description "AirPrint"
mDNS_proxy service AirPlay      enable       (2)
mDNS_proxy service AirPrint     disable
```

Additionally, certain mDNS proxy services may be pre-configured and made available as a part of a factory default configuration. Examples of these pre-configured network services may include AirPlay™ and AirPrint™ services.

The AirPlay™ service is a protocol that allows for wireless streaming of audio and/or video content between two digital devices. One type of digital device, Apple® TV, provides AirPlay™ services that will enable a user to seamlessly discover Apple® TVs, and do mirroring of audio and video content.

The AirPrint™ service is a protocol that enables printing of data sent over a wireless interconnect to specific printers without previous installation of printer-specific drivers. The AirPrint™ service may have a number of factory default service-ids, including "_ipp._tcp" and "_pdl-datastream._tcp" as shown above.

Referring still to FIG. 2, device classification logic 250 is adapted to detect, from messages received from a digital device, whether the digital device should be classified as a "server device" or a "user device" as defined above. According to one embodiment of the disclosure, a digital device is classified as a "server device" upon receipt of an mDNS Response message advertising a network service identical to those network services supported by controller 120. This classification enables controller 120 to more efficiently determine which digital devices provide a requested network service.

Referring still to FIG. 2, service discovery logic 260 is configured to generally locate server devices within network 100 of FIG. 1 and control which network services are returned to the user device. According to one embodiment of the disclosure, service discovery logic 260 may be adapted to perform an initial determination as to which APs correspond to digital (server) devices capable of providing a requested network service (referred to as "AP-server") and which AP corresponds to a digital (user) device requesting a particular network service (referred to as "AP-user").

After formulating this set of AP-servers, a secondary determination would be performed in which a first level of location assessment is performed by determining relative location of each AP-server to the AP-user using information contained in an Association table and/or one or more Neighbor AP lists. Thereafter, a second level of location assessment is performed by performing a more detailed location analysis on a group of APs, including at least one AP-server, to determine whether the AP-server under analysis satisfies certain location requirements before user device is notified of such network services.

As further shown in FIG. 2, according to one embodiment of the disclosure, storage 270 may be adapted to store one or more Association tables 280 to identify those digital devices that are associated with each AP $130_1$-$130_M$ implemented within network 100. For instance, as an illustrative example, storage 270 maintains dedicated Association tables $280_1$-$280_M$ for each AP $130_1$-$130_M$ implemented within network 100. Although not shown, each Association table $280_1$, . . . , or $280_M$ (e.g., association table $280_1$) includes at least a Media Access Control (MAC) address and/or Internet Protocol (IP) address for each digital device associated with a corresponding AP $130_1$, . . . , or $130_M$ (e.g., AP $130_1$). Of course, in the alternative, a single Association table may be maintained in which each entry includes a MAC address for a particular AP $130_1$, . . . , or $130_M$ along with a corresponding MAC address for a digital device associated with that AP.

Additionally, storage 270 may be adapted to store one or more Neighbor AP lists 290 (e.g., Neighbor AP lists $290_1$-$290_M$) to identify those APs that are detected by a particular AP $130_1$-$130_M$ implemented within network 100.

B. Exemplary Signal Coverage Areas

Figure 3:
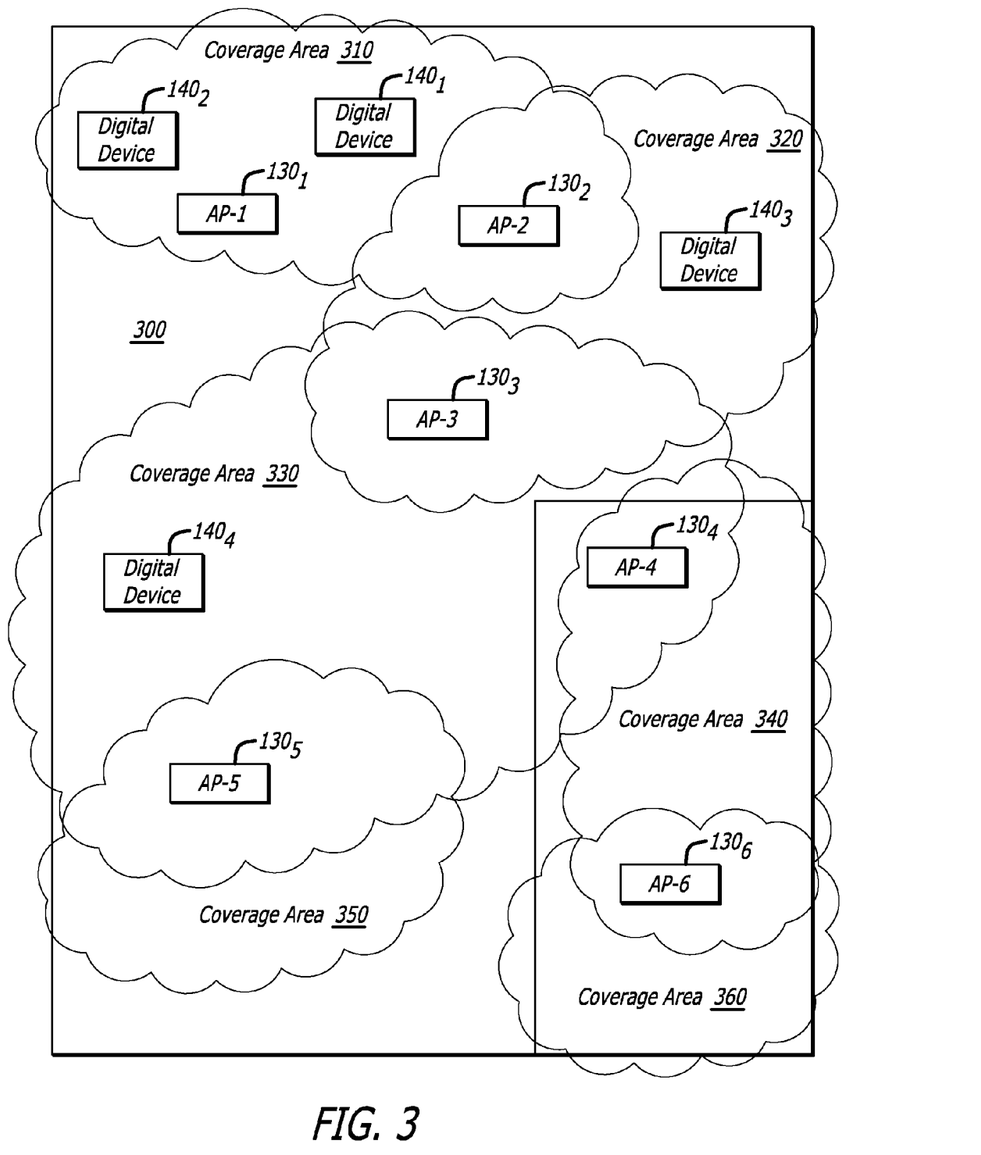
FIG. 3 is an exemplary illustration of signal coverage areas for different APs within the network of FIG. 1.

Referring to FIG. 3, an exemplary illustration of signal coverage areas for APs within network 100 that are used in formulating Neighbor AP lists is shown. In accordance with the illustrative network topology as shown in FIG. 1, shared network 100 comprises APs $130_1$-$130_6$ which are positioned throughout a prescribed area 300.

When placed in an active state, AP-1 $130_1$ supports a signal coverage area 310, namely a geographic signal propagation boundary, within which AP-1 $130_1$ is able to transmit and/or receive wireless signals. According to this embodiment of the invention, AP-2 $130_2$ along with other digital devices $140_1$-$140_3$ reside within coverage area 310 and are detected by AP-1 $130_1$.

Similarly, AP-2 $130_2$ provides a signal coverage area 320 within which AP-2 $130_2$ detects digital device $140_3$ and AP-3 $130_3$. AP-3 $130_3$ provides a signal coverage area 330 within which, at this time and for illustrative purposes, two APs $130_4$ and $130_5$ are detected.

According to these illustrative coverage areas 310-330, the Association table(s) would identify that digital devices $140_1$-$140_2$ are associated with AP-1 $130_1$ and digital device $140_3$ is associated with AP-2 $130_2$. Furthermore, the Neighbor AP lists(s) would identify that (i) AP-2 $130_2$ is within coverage area 310 for AP $130_1$; (ii) AP-3 $130_3$ is within coverage area 320 for AP $130_2$; (iii) AP-4 $130_4$ and AP-5 $130_5$ are within coverage area 330 of AP-3; and (iv) AP-6 $130_6$ is within coverage area 340 of AP-4 $130_4$. AP-5 $130_5$ and AP-6 $130_6$ are not associated with any digital devices and do not detect any other APs within their prescribed coverage areas 350 and 360.

C. Location Based Service Discovery Operations

Figure 4A:
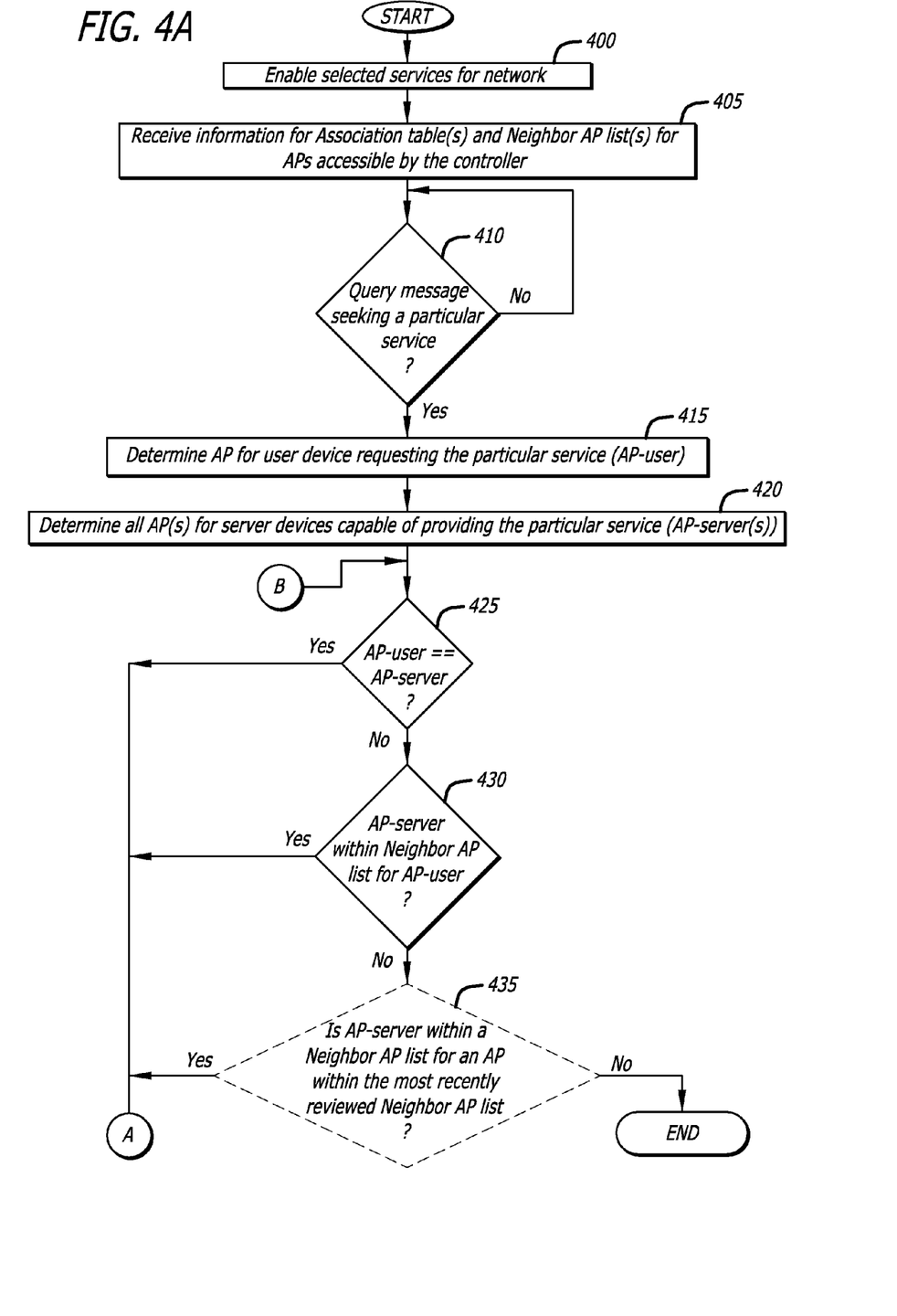
FIGS. 4A and 4B are exemplary flowcharts outlining operations performed by a controller adapted with location based service discovery functionality.
Figure 4B:
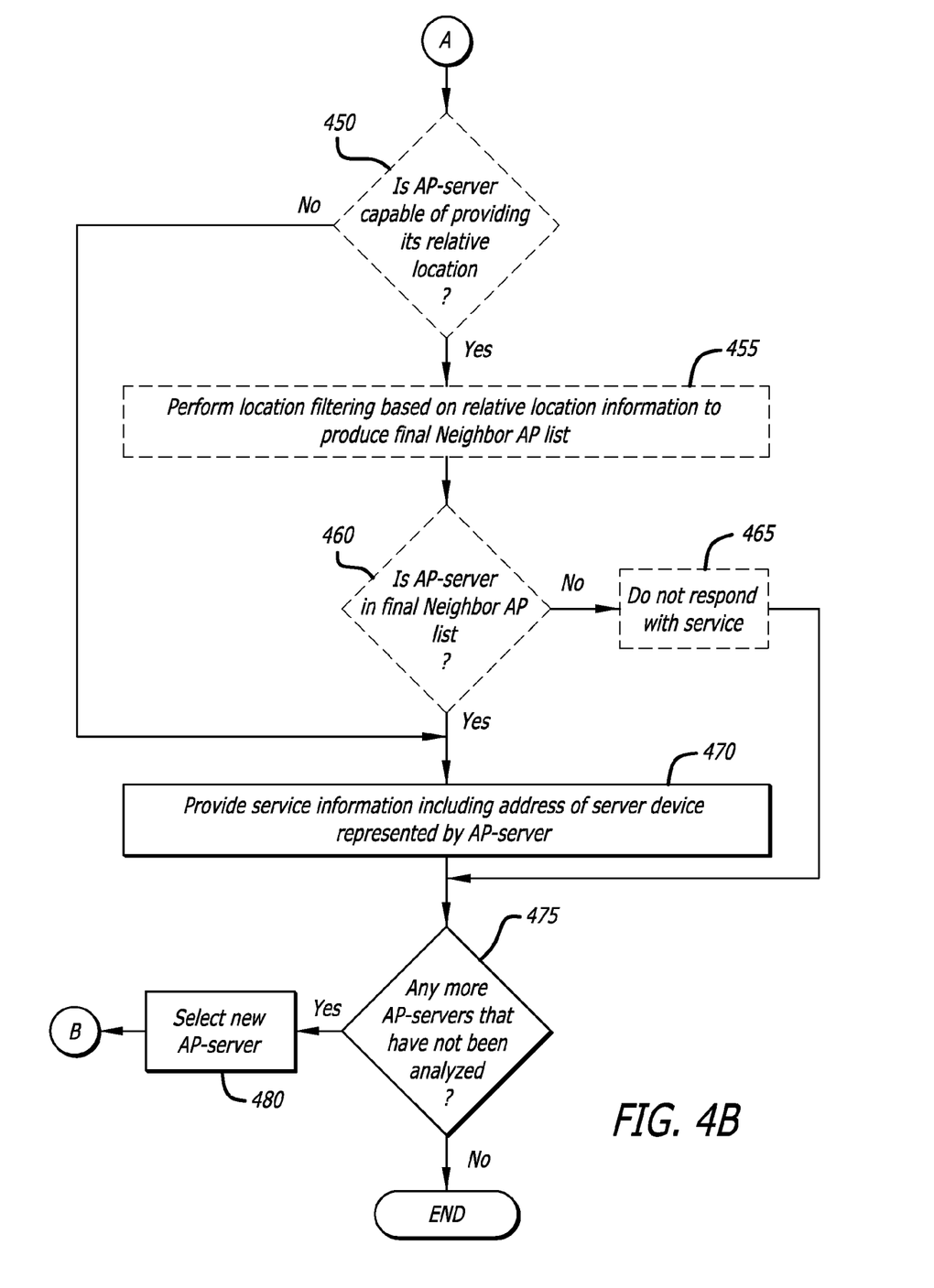

Referring to FIGS. 4A-4B, exemplary flowcharts outlining operations performed by a controller adapted with location based service discovery functionality is shown. According to one embodiment of the disclosure, at block 400, the mDNS proxy logic is configured to enable selected network services available over the network. This configuration may be performed during manufacture of the controller (pre-configured) and/or after deployment through the use of CLI commands. The CLI commands enable a user to alter the state of a selected network service(s) from a first state (e.g. default state where the corresponding network service is disabled) to a second state (e.g., active state where the corresponding network service is enabled).

Furthermore, the controller is adapted to receive information for placement within one or more Association table(s) and Neighbor AP list(s), which collectively provide information directed to network topology (block 405). In particular, the Association table(s) includes information that allows the controller to discern what digital devices are associated with a particular AP. From this information, the mDNS proxy logic is able to determine which digital devices are to be likely physically proximate to the particular AP.

The Neighbor AP list(s) includes information that allows the controller to discern whether there are any APs that are proximate to the particular AP. This is accomplished by the particular AP monitoring its signal coverage area for wireless signaling (e.g., beacons, etc.) from other APs (hereinafter "neighboring APs"). Upon detecting such signaling, information identifying a neighboring AP (e.g., MAC address) is stored. The Neighbor AP list is useful in determining the location of APs relative to each other.

As shown in block 410, the controller detects a Query message seeking to discover resources for a particular network service. Herein, according to one embodiment of the invention, the Query message is an mDNS-based message transmitted from a user device and seeking to discover server devices providing the particular network service.

As shown in blocks 415 and 420, upon receipt of the Query message, operations are performed to uncover the identity of the AP (hereinafter "AP-user") associated with the user device requesting the particular network service (or physically proximate to a wired user device) and one or more APs used by (or proximate to) a server device that provides a requested network service (hereinafter "AP-server").

After such operations are performed, an analysis is conducted to better understand the network topology in order to select those network services that are more geographically desirable for the user device. More specifically, an initial determination is made as to whether the AP-user and the AP-server are the same AP (block 425). This determination may be performed by comparing the MAC address of the AP-user to the MAC address of the AP-server.

If the AP-user constitutes the same access point as the AP-server, the controller may be configured to perform an optional geographic filtering process (blocks 450-460) or simply transmit a Response message that includes information associated the server device (e.g., MAC address) along with records needed by the user device to perform the requested network service (block 470). This initial determination attempts to uncover a network topology, such as the user device and server device being associated with the same AP, where there is a high level of likelihood that the server device is in close physical proximity to the user device.

However, if the AP-user is different than the AP-server, a second determination is made as to whether the AP-server is an entry within the Neighbor AP list maintained by the AP-user (hereinafter "AP-user Neighbor list") as set forth in block 430. This determination may be conducted by the controller comparing the MAC address for the AP-server to the MAC addresses of the detected APs stored within the AP-user Neighbor list.

If the AP-server is found within the AP-user Neighbor list, the controller may be configured to either (i) perform the optional geographic filtering process (blocks 450-460) or (ii) transmit a Response message that includes information associated the server device (e.g., MAC address) along with records needed by the user device to perform the requested network service (block 470). This determination attempts to uncover a network topology with a moderate likelihood of close proximity between the user and server devices.

However, if the AP-server is not present in the AP-user Neighbor list, at this time, the controller may ignore the Query message and refrain from providing the user device with information that this particular server device is able to provide the requested network service.

As identified by dashed lines in FIG. 4A, as an alternative embodiment, it is contemplated that the coverage area for network service discovery may be dynamic, and thus, can be expanded depending on network deployment. According to one embodiment of the disclosure, a user interface is generated to allow an administrator to select a level of network service discovery ranging from analysis of the AP-user Neighbor list exclusively to analysis of multiple levels of Neighbor AP lists as described below for illustrative purposes (block 435).

As an illustrative example, referring to both FIGS. 3 and 4A, for network service discovery over an enterprise network, the assigned level of network service discovery may be extended so that the controller is configured to analyze the Neighbor AP list(s) for each and every AP identified in the AP-user Neighbor list in order to determine if the AP-server is within such list(s).

For this example, "AP-user" is represented as AP-1 130$_1$ and "AP-server" is represented as AP-3 130$_3$. Herein, the controller analyzes the AP-1 Neighbor list and determines that AP-3 130$_3$ is not listed therein (only AP-2 130$_2$). Based on such findings, the controller analyzes the AP-2 Neighbor list in order to determine if AP-3 130$_3$ is listed therein. As identified by coverage area 320, AP-3 130$_3$ would be listed within the AP-2 Neighbor list. As a result, the controller either performs the optional geographic filtering process or provides requisite network service information (e.g. server device address, records needed to perform the requested network service, etc.).

It is further contemplated that the network service discovery area may be expanded in an iterative manner by continued analysis of different Neighbor AP lists. This iterative analysis of Neighbor AP lists may be needed to support a large network coverage area such as a shopping mall, campus, or the like.

As another illustrative example, referring to FIGS. 3-4A, where "AP-user" is represented as AP-1 130$_1$ and "AP-server" is represented as AP-6 130$_6$. For this example, four levels of Neighbor AP list analysis would be conducted prior to completion of network service discovery.

First, the controller conducts a first level of analysis by analyzing the AP-1 Neighbor table and determining whether AP-6 130$_6$ is listed therein. Upon finding no such listing, the controller conducts a second level of analysis by analyzing the AP-2 Neighbor list in order to determine if AP-6 130$_6$ is listed therein. As identified by coverage area 320, AP-6 130$_6$ would not be listed in this particular Neighbor AP list.

Given that only two levels of analysis have been conducted, the controller may conduct a third level of analysis by analyzing the AP-3 Neighbor list in order to determine if AP-6 130$_6$ is listed therein. As identified by coverage area 330, AP-6 130$_6$ still would not be listed in the AP-3 Neighbor list.

As a result, given AP-3 Neighbor list features two access points, namely AP 130$_4$ and AP 130$_5$, the controller conducts a fourth (and final) level of analysis by analyzing both AP-4 Neighbor list and AP-5 Neighbor list in order to determine if AP-6 130$_6$ is listed therein. As identified by coverage area 340, AP-6 130$_6$ would be listed in the AP-4 Neighbor list.

As a result of such operations, the controller either performs the optional geographic filtering process as described in FIG. 4B or provides requisite network service information (e.g. server device address, recorded needed to perform the requested network service, etc.).

Referring to FIG. 4B, identified by dashed lines, the optional, geographic filtering process narrows coverage area for network service discovery based on the relative locations of the APs associated with digital devices capable of providing the requested network service. Such operations may be conducted prior to the controller transmitting a Response message to provide network services requested in the Query message.

As shown in FIG. 4B, an analysis is conducted in which a determination is made as to whether a group of APs, including at least the AP-server, is capable of providing relative location information to the controller (block 450). For instance, this group may comprise the AP-server by itself or it may comprise all APs contained within a specific Neighbor AP list or multiple Neighbor AP lists. The relative location of an AP may be derived from an AP location provisioning parameter that is set during installation of the AP or from a selected portion of a beacon advertised by the AP. This selected portion may be an information element with the beacon itself.

If the group of APs is not provisioned to provide its relative location information, the controller simply places such APs into an AP Service list for processing as described below. However, if the one or more APs are provisioned to provide their relative location information, the mDNS proxy logic determines the relative location of each AP, and thereafter, performs a geographic filtering process to only maintain those APs that meet certain filtering requirements (block 455). Such filtering requirements may be directed to geographic constraints such as (i) distance thresholds from AP-user (or digital device requesting the network service), (ii) specific areas within the network (e.g., public, private, etc.), specific floors (e.g., same floor, specific floor, etc.), or the like.

Upon determining that each AP satisfies the filtering constraints, the AP is placed into the AP Service list. Upon completing analysis of each of the one or more APs, a determination is made as to whether the AP-server is within the AP Service list (block 460). If so, in response to the Query message, the controller provides information for performing this service (e.g. server device address, recorded needed to perform the requested network service, etc.) to the user device (block 470). If not, the controller refrains from providing such information and ignores the Query message (block 465). This process continues for each AP representing a server device that is capable of providing the requested network service (blocks 475-480).

AP-Based Service Discovery Monitoring

A. General Network Architecture

Figure 5:
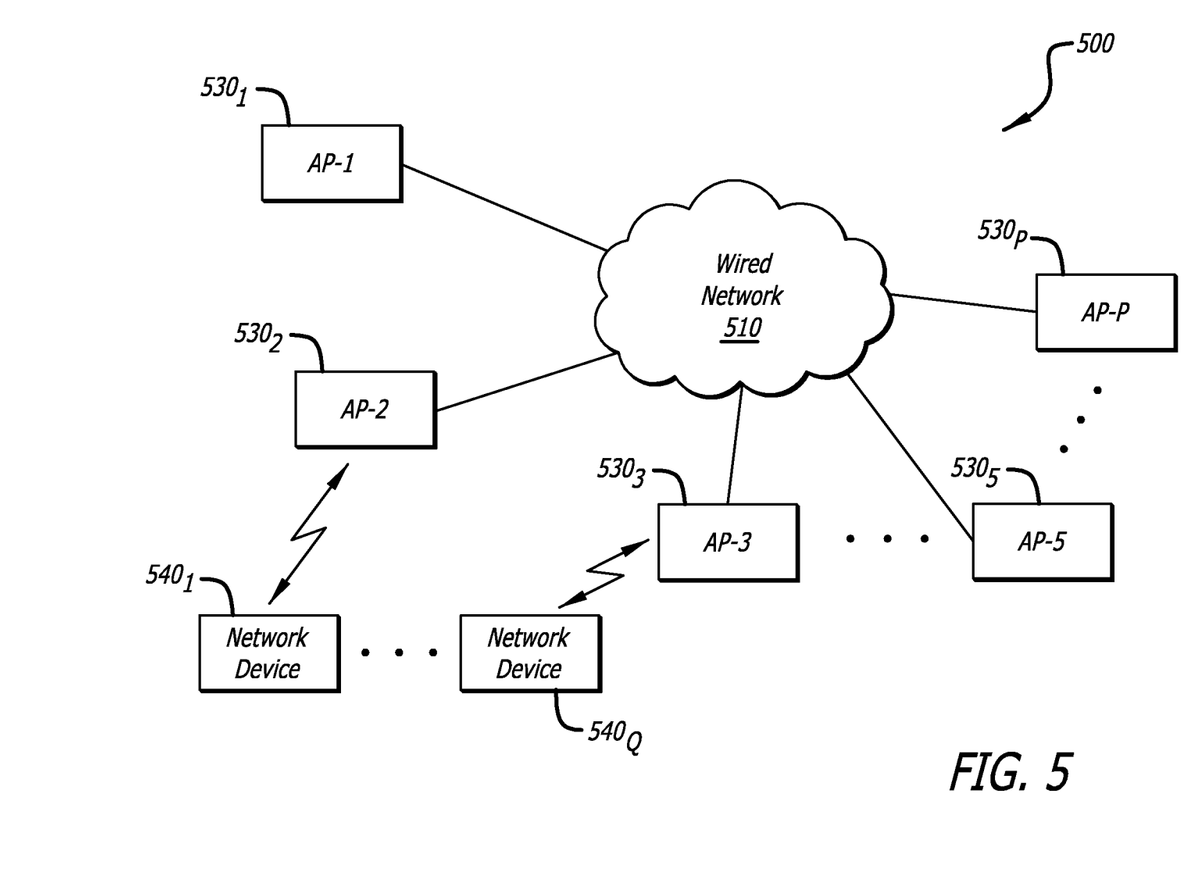
FIG. 5 is a second exemplary embodiment of a network with location based service discovery performed by one or more APs within the network.

Referring to FIG. 5, a second exemplary embodiment of a network supporting location based service discovery is shown. Herein, a shared network 500 comprises a wired network 510 that is adapted to provide communications between a plurality of access points (APs) 530$_1$-530$_P$ (P≥2). Besides being adapted to support wireless communications with digital devices 540$_1$-540$_Q$ (Q≥1) and maintaining an Association table and Neighbor AP list, one or more of APs 530$_1$-530$_P$ is further adapted to access Neighbor AP lists from other APs within network 500.

Figure 6:
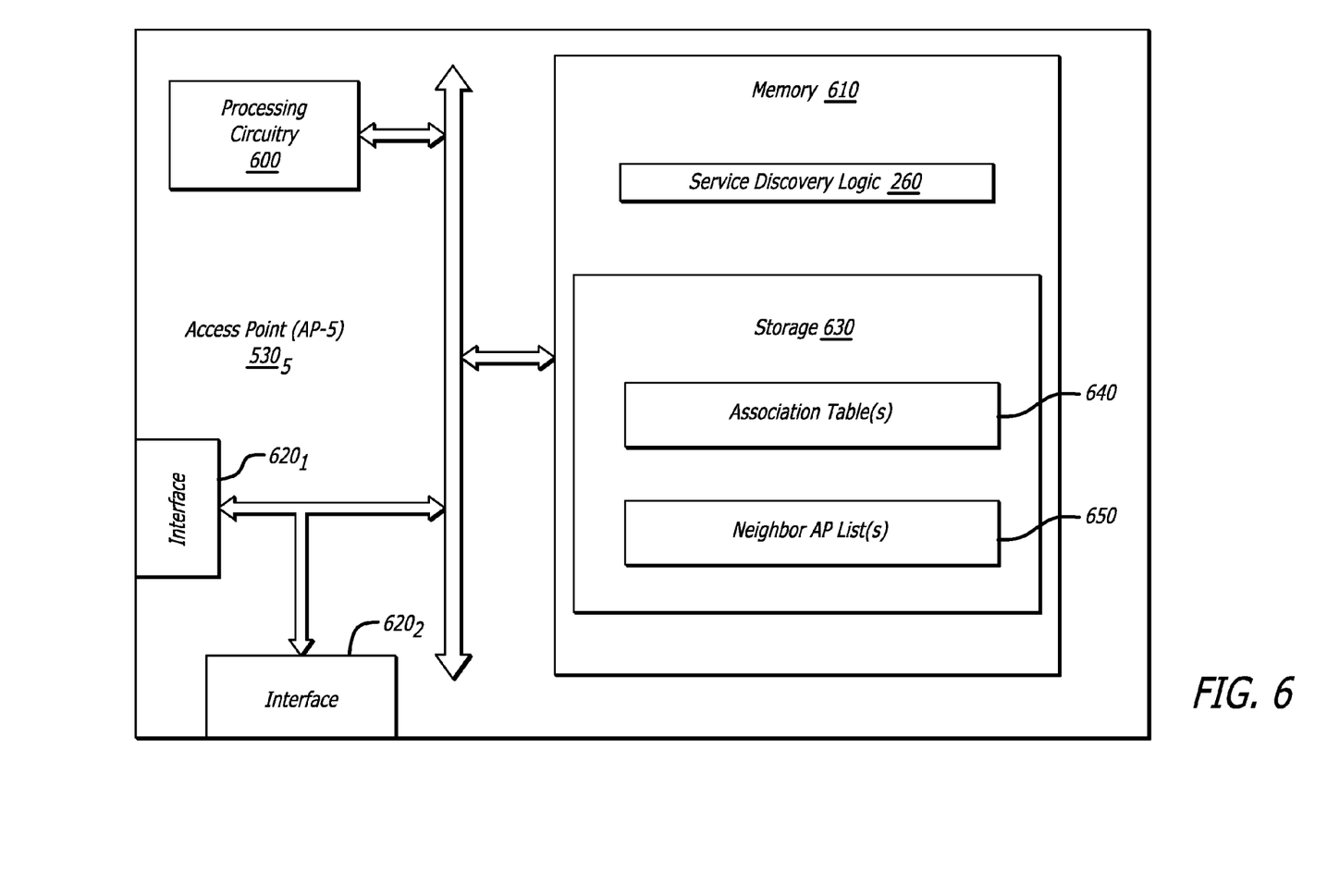
FIG. 6 is an exemplary block diagram of an access point operating as an mDNS proxy and using both association and neighboring AP information to perform location based service discovery.

As set forth in FIG. 6, an exemplary block diagram of logic within AP 530$_5$ of FIG. 5 is shown. Herein, AP 530$_5$ comprises processing circuitry 600 and memory 610, which are coupled via interconnects 615 to a plurality of interfaces 620 that enable AP $530_5$ to communicate over wired and wireless medium. For instance, a first interface $620_1$ may be implemented as a physical interface including one or more ports for wired connectors for communications over wired network 510. Additionally, a second interface $620_2$ may be implemented with one or more antenna units for transmitting and/or receiving wireless signals from other digital devices.

As further shown in FIG. 6, according to one embodiment of the disclosure, processing circuitry 600 is coupled to memory 610 for execution of service discovery logic 260 which is stored in memory 610. According to one embodiment of the invention, service discovery logic 260 is configured to locate particular network services within network 500 of FIG. 5 by analyzing Association table(s) 640 and/or Neighbor AP list(s) 650 maintained by AP $530_5$ within storage 630 as well as to retrieve information from Association table(s) and/or Neighbor AP list(s) for other APs within network 500.

B. Exemplary Signal Coverage Areas for AP-Based Service Discovery

Figure 7:
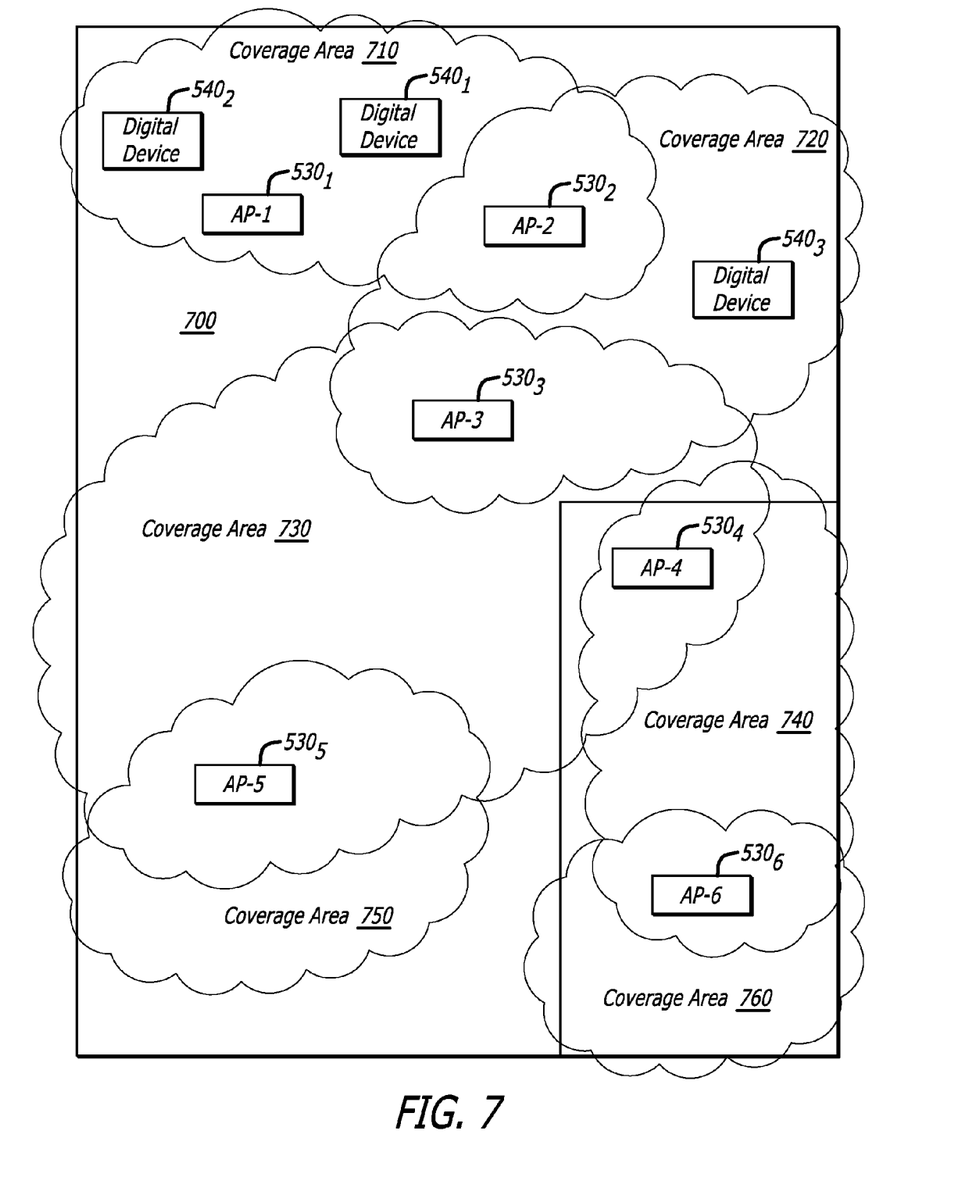
FIG. 7 is an exemplary illustration of signal coverage areas for different access points (APs) within the network of FIG. 5 that are used to formulate Neighbor AP lists.

Referring to FIG. 7, an exemplary embodiment of signal coverage areas for exemplary APs within the network of FIG. 5 is shown. Herein, APs $530_1$-$530_6$ are positioned throughout a prescribed area 700.

When placed in an active state, AP-1 $530_1$ provides a signal coverage area 710 that defines the geographic signal propagation boundary within which AP-1 $530_1$ is able to transmit and/or receive wireless signals. According to this embodiment of the invention, AP-2 $530_2$ along with other digital devices $540_1$-$540_3$ reside within coverage area 710 and are detected by AP-1 $530_1$.

Similarly, AP-2 $530_2$ provides a signal coverage area 720 within which AP-2 $530_2$ detects digital device $540_3$ and AP-3 $530_3$. AP-3 $530_3$ provides a signal coverage area 730 within which, at this time and for illustrative purposes, AP-4 $530_4$ and AP-5 $530_5$ are detected.

According to these illustrative coverage areas 710-730, the AP-1 association table(s) would identify that digital devices $540_1$-$540_2$ are associated with AP-1 $530_1$ and digital device $540_3$ is associated with AP-2 $530_2$. Furthermore, the neighbor AP lists(s) would identify that (i) AP-2 $530_2$ within coverage area 710 for AP-1 $530_1$, (ii) AP-1 $530_1$ and AP-3 $530_3$ within coverage area 720 for AP-2 $530_2$, (iii) AP-4 $530_4$ and AP-5 $530_5$ are within coverage area 730 of AP-3 $530_3$, and (iv) AP-6 $530_6$ is within coverage area 740 of AP-4 $530_4$. AP-5 $530_5$ and AP-6 $530_6$ are not associated with any digital devices and do not detect any other APs within its prescribed coverage areas 750 and 760.

C. Location Based Service Discovery Operations by an Access Point

Figure 8A:
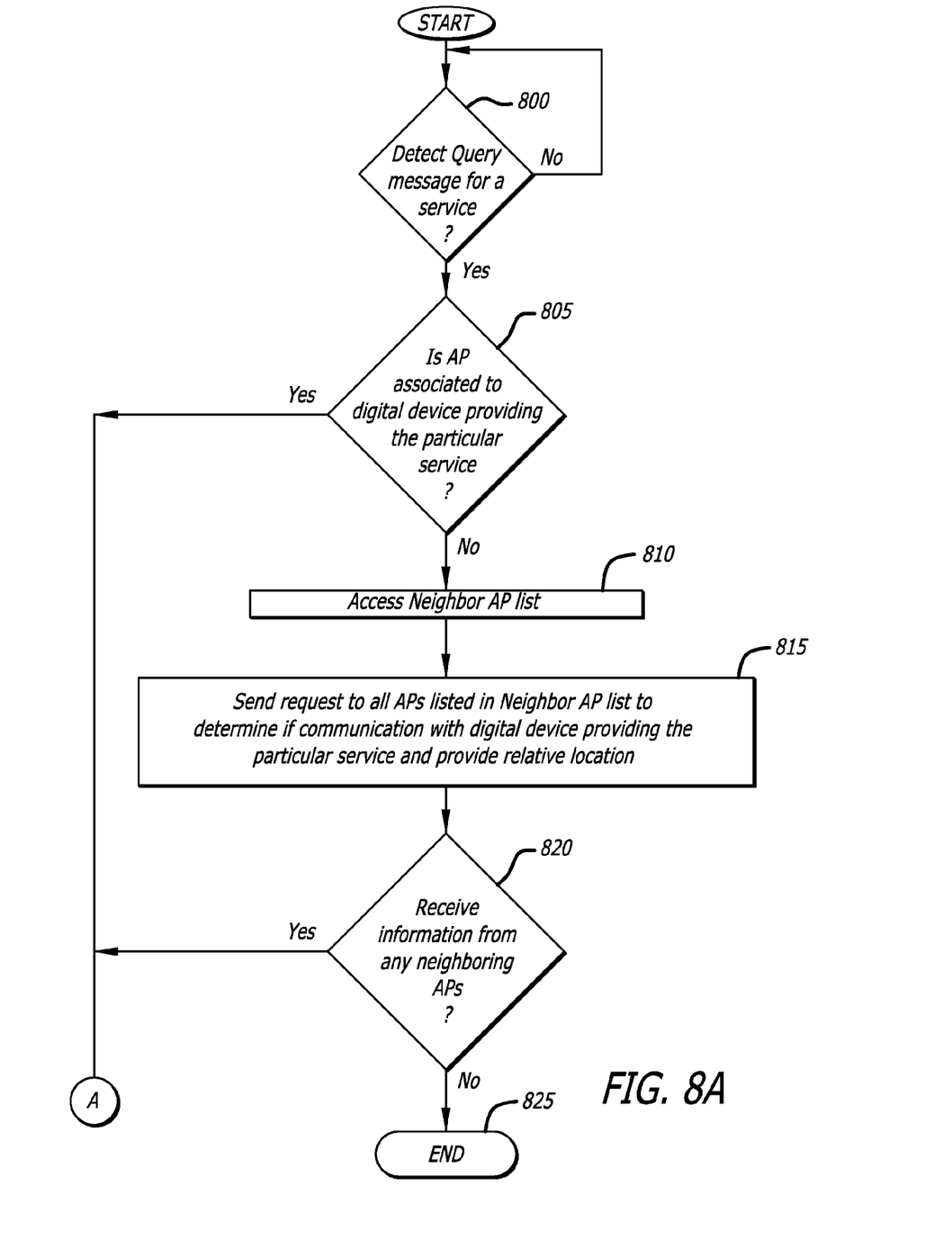
FIGS. 8A and 8B are exemplary flowcharts outlining operations performed by an access point adapted with location based service discovery functionality.
Figure 8B:
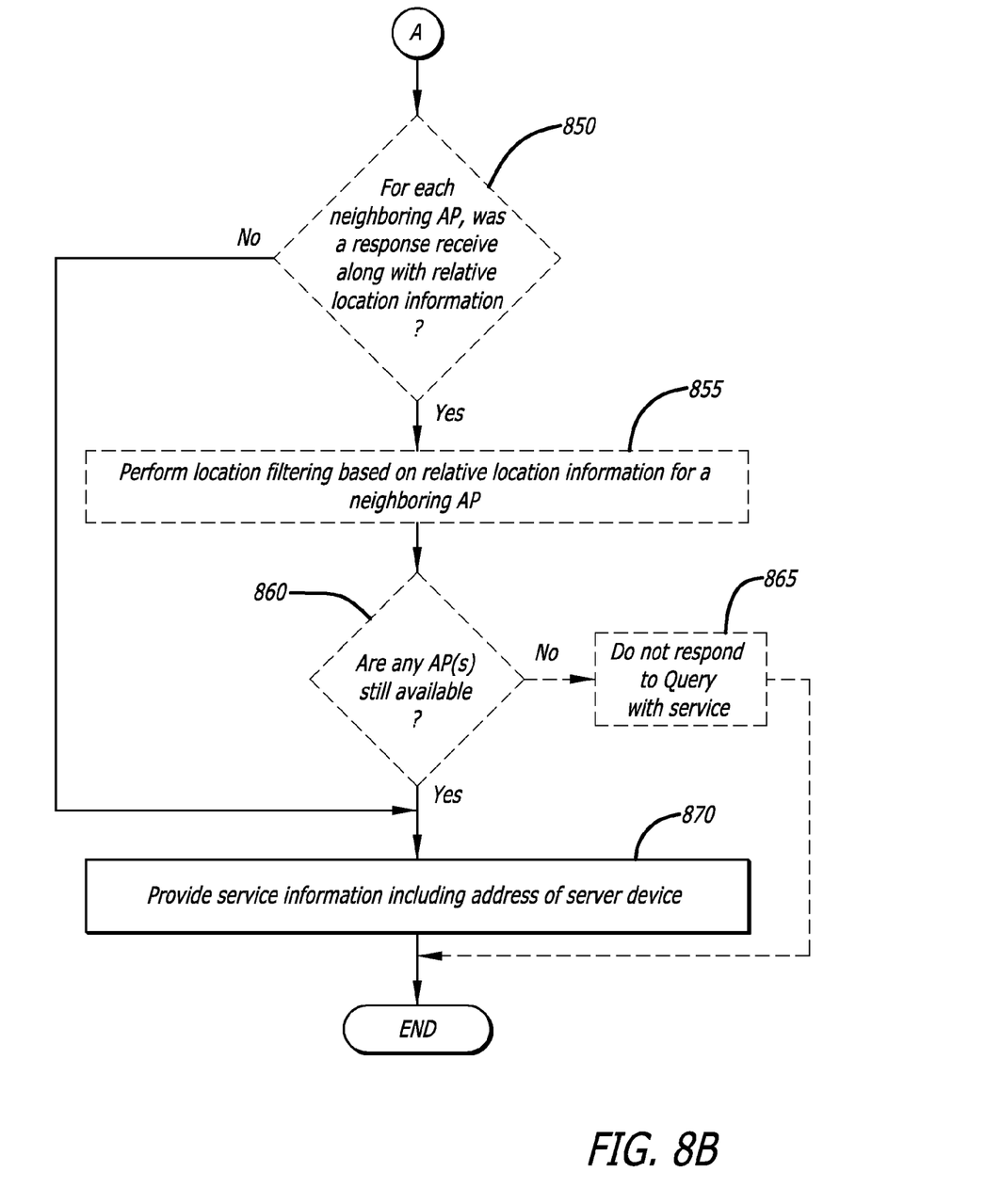

Referring to FIGS. 8A-8B, exemplary flowcharts outlining operations performed by an access point (AP) adapted with location based service discovery functionality is shown. According to one embodiment of the disclosure, AP detects a Query message for a particular network service from an associated digital device (block 800). Thereafter, a determination is made by the AP as to whether it is associated with a digital device that provides the particular network service (block 805).

If so, according to one embodiment of the invention, the AP enters into an optional secondary mode of operation to perform a refined location analysis through geographic filtering (blocks 850-860). Of course, it is contemplated that the AP may simply be configured to transmit a Response message that includes information associated the server device (e.g., MAC address) along with records needed by the user device to perform the requested network service as set forth in block 870.

If the AP is not associated with a digital device that provides the particular network service, the AP accesses its Neighbor AP list and sends requests to all APs within the Neighbor AP list to determine if these APs are communicating with a digital device that provides the particular network service (blocks 810 and 815) and provide relative location information for that AP.

Thereafter, a determination is made as to whether the AP received information from any of the neighboring APs of communications with a digital device performing the particular network service (block 820). If not, the AP disregards the Query message and the process ends (block 825). However, if the AP receives information from any of the neighboring APs of communications with a digital device performing the particular network service, the AP may enter into the secondary mode of operation to perform the refined location analysis using the geographic filtering process described in FIG. 8B.

Referring to FIG. 8B, identified by dashed lines, the optional geographic filtering process narrows the coverage area for network service discovery based on the relative locations of the APs representing server devices capable of providing the requested network service (hereinafter "server APs"). Such operations may be conducted prior to the controller transmitting a Response message to provide network services requested in the Query message.

As shown in FIG. 8B, an initial determination is made as to whether some or all of the server APs, learned from information received in response to requests by the AP for neighboring APs to access their association tables and provide such information, are capable of providing their relative location information (block 850). For instance, this "relative location" may be derived from an AP location provisioning parameter that is set during installation of that particular server AP or from a selected portion of a beacon advertised by that particular server AP. This selected portion may be an information element with the beacon itself.

If any of the responding neighboring APs (server APs) is not provisioned to provide its relative location information, the controller simply places this AP into an AP Service list for processing as described below. However, for those server APs that are provisioned to provide their relative location information, the AP determines these relative locations, and thereafter, performs selected filtering operations in accordance with the geographic filtering process for restricting network services from areas that are physically inconvenient from the user device as set forth in FIG. 4B (block 855).

Upon determining that a particular server AP satisfies the filtering constraints, the server AP is placed into the AP Service list. Upon completing analysis of each of the server APs, a determination is made as to which server APs are within the AP Service list (block 860). In response to the Query message, for each server AP, the AP provides information for performing this network service (e.g. server device address, recorded needed to perform the requested network service, etc.) to the user device (block 870). If not, the AP refrains from providing such information and ignores the Query message (block 865).

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
responsive to receiving a request for a network service, determining from the request, by a network controller, a geographic proximity between a server device advertising the network service and a user device, wherein the network service comprises at least one of enabling streaming of audio, enabling streaming of video, and enabling printing between the server device and the user device, and wherein the determining of the geographic proximity comprises determining a relationship between an access point associated with the user device and an access point associated with the server device, wherein determining the relationship between the access point associated with the user device and the access point associated with the server device includes determining when the access point associated with the server device is capable of providing a relative location for the access point associated with the server device, wherein the relative location is derived from a selected portion of a beacon advertised by the access point associated with the server device;
receiving a first list of neighboring access points detected by the access point associated with the user device, the first list including information identifying at least one access point other than the access point associated with the user device within a signal coverage area of the access point associated with the user device;
determining whether the access point associated with the server device is identified within the first list; and
providing, by the network controller, information for accessing the server device to the user device when the relative location of the access point associated with the server device is within a predetermined distance from the access point associated with the user device.

2. The method of claim 1, wherein the determining the relationship between the access point associated with the user device and the access point associated with the server device comprises determining whether the access point associated with the user device and the access point associated with the server device is a same access point.

3. The method of claim 2, wherein the access point associated with the user device and the access point associated with the server device are determined to be the same access point when a unique address assigned to the access point associated with the user device is identical to a unique address assigned to the access point associated with the server device.

4. The method of claim 3, wherein the unique address assigned to the access point associated with the user device is a Media Access Control (MAC) address and the unique address assigned to the access point associated with the server device also is the MAC address.

5. The method of claim 2, wherein
the providing of the information for accessing the server device to the user device only occurs when the access point associated with the user device and the access point associated with the server device are determined to be the same access point, or the access point associated with the server device is listed within the first list, and
the information includes address information associated with the server device along with information utilized by the user device to perform the requested network service.

6. The method of claim 2 further comprising:
determining whether the access point associated with the server device is listed within a second list of neighboring access points, the second list including identifying at least one access point within a signal coverage area of a neighboring access point listed in the first list, and wherein the providing of the information for accessing the server device to the user device only occurs when the access point associated with the user device and the access point associated with the server device are determined to be the same access point, the access point associated with the server device is listed within the first list, or the access point associated with the server device is listed within the second list.

7. The method of claim 2, wherein
the determining of the relationship between the access point associated with the user device and the access point associated with the server device further comprises determining when the access point associated with the server device is capable of providing a relative location; and
providing the information to enable the user device to perform the network service when the relative location of the access point associated with the server device satisfies one or more geographic constraints.

8. The method of claim 7, wherein the one or more geographic constraints includes a specific floor assigned to the server device.

9. The method of claim 1 further comprising:
ignoring a request for the network service from the user device when the relative location of the access point associated with the server device fails to satisfy the one or more geographic constraints.

10. The method of claim 1, wherein prior to determining the geographic proximity between the server device and the user device, the network controller determining a classification for the server device, and thereafter, determining the geographic proximity between the server device and the user device by the network controller when the server device is classified as a server device providing one or more network services including the network service requested for use by the user device.

11. The method of claim 10, wherein the network controller determining the classification of the server device as the server device upon receipt of a Multicast Domain Name System (mDNS) Response message advertising the network service in response to a mDNS Request message for the network service by the user device.

12. The method of claim 1, wherein the network controller includes a controller comprising an interface that includes one or more wired ports communicatively coupled to the access point associated with the user device and the access point associated with the server device.

13. The method of claim 1, wherein the network controller includes an access point comprising one or more antennas for establishing wireless connectivity with at least the server device and one or more wired ports for communications with the access point associated with the user device and the access point associated with the server device over a wired medium.

14. A digital device comprising:
a network controller interface including one or more wired ports;
a processing circuitry; and
a memory coupled to the processing circuitry, the memory including logic that, upon execution by the processing circuitry, responsive to receiving a request for a network service, determines from the request a geographic proximity between a server device advertising the network service and a user device requesting the network service, wherein the network service comprises enabling at least one of enabling streaming of audio, enabling streaming of video, and enabling printing between the server device and the user device, and based upon an analysis of a relationship between an access point associated with the user device and an access point associated with the server device, receive a first list of neighboring access points detected by the access point associated with the user device, the first list including information identifying at least one access point other than the access point associated with the user device within a signal coverage area of the access point associated with the user device;

determine whether the access point associated with the server device is identified within the first list; and provides information for accessing the server device to the user device based at least on the determined relationship between the access point associated with the user device and the access point associated with the server device, wherein:

the information is provided to the user device responsive to a determination that the access point associated with the user device is the same access point as the access point associated with the server device or the access point associated with the server device is listed with the first list; and the information includes address information associated with the server device and information to perform the requested network service.

15. The digital device of claim 14, wherein the logic, included in the memory and upon execution by the processing circuitry, analyzes the relationship between the access point associated with the user device and the access point associated with the server device by determining whether the access point associated with the user device, which is communicatively coupled to the digital device via the one or more wired ports, is a same access point as the access point associated with the server device also communicatively coupled to the digital device via the one or more wired ports.

16. The digital device of claim 14, wherein the logic, included in the memory and upon execution of the processing circuitry, determines the access point associated with the user device is the same access point as the access point associated with the server device when a Media Access Control (MAC) address assigned to the access point associated with the user device is identical to the MAC address assigned to the access point associated with the server device.

17. The digital device of claim 14, wherein the analysis of the relationship between the access point associated with the user device and the access point associated with the server device further comprises determining when the access point associated with the server device is capable of providing a relative location for the access point associated with the server device; and providing the information to enable the user device to perform the network service when the relative location of the access point associated with the server device satisfies one or more geographic constraints.

18. The digital device of claim 17, wherein the one or more geographic constraints includes a specific floor assigned to the server device.

19. A non-transitory computer readable medium that includes logic, when executed by the processing circuitry, perform operations, comprising:

determining, by a network controller, a classification of a server device as a server device providing a network service based on a Multicast Domain Name System (mDNS) Response message advertising the network service in response to a mDNS Request message for the network service by a user device;

subsequent to determining the classification, determining from the MDNS request, by the network controller, a geographic proximity between the server device and the user device, wherein the network service comprises at least one of enabling streaming of audio, enabling streaming of video, and enabling printing between the server device and the user device, wherein the determining of the geographic proximity between the server device and the user device comprises determining a relationship between an access point associated with the user device and an access point associated with the server device;

receiving a first list of neighboring access points detected by the access point associated with the user device, the first list including information identifying at least one access point other than the access point associated with the user device within a signal coverage area of the access point associated with the user device;

determining whether the access point associated with the server device is identified within the first list; and providing, by the network controller, information for accessing the server device to the user device based on the determined relationship between the access point associated with the user device and the access point associated with the server device.

20. The non-transitory computer readable medium of claim 19, wherein the logic, upon determining the relationship between the access point associated with the user device and the access point associated with the server device, comprises determining whether the access point associated with the user device is a same access point as the access point associated with the server.

21. The non-transitory computer readable medium of claim 20, wherein the logic, upon determining the relationship between the access point associated with the user device and the access point associated with the server device, determines the access point associated with the user device is the same access point as the access point associated with the server device when a unique address assigned to the access point associated with the user device is identical to a unique address assigned to the access point associated with the server device.

22. The non-transitory computer readable medium of claim 20, wherein the determining of the relationship between the access point associated with the user device and the access point associated with the server device further comprises determining when the access point associated with the server device is capable of providing a relative location for the access point associated with the server device; and the providing of the information to enable the user device to perform the network service when the relative location of the access point associated with the server device satisfies one or more geographic constraints.

23. A system comprising:

a processing resource; and a memory resource storing machine readable instructions to cause the processing resource to:

responsive to receiving a request for a network service, determine from the request, by a network controller, a geographic proximity between a server device advertising the network service and a user device, wherein the network service comprises enabling at least one of enabling streaming of audio, enabling streaming of video, and enabling printing between the server device and the user device, wherein to determine the geographic proximity includes to determine when an access point associated with the server device is capable of providing a relative location;

receive a first list of neighboring access points detected by an access point associated with the user device, the first list including information identifying at least one access point other than the access point associated with the user device within a signal coverage area of the access point associated with the user device;

determine whether the access point associated with the server device is identified within the first list; and provide, by the network controller, information to enable the user device to access the network service when the relative location of the access point associated with the server device satisfies a geographic constraint, wherein the geographic constraint includes a specific floor assigned to the server device.

\* \* \* \* \*